(12) United States Patent
Hayashi et al.

(10) Patent No.: US 7,232,151 B2
(45) Date of Patent: Jun. 19, 2007

(54) AIRBAG DEVICE

(75) Inventors: Shinji Hayashi, Hikone (JP); Yuki Kanno, Echi-gun (JP)

(73) Assignee: Takata Corporation, Tokyo (JP)

( * ) Notice: Subject to any disclaimer, the term of this patent is extended or adjusted under 35 U.S.C. 154(b) by 192 days.

(21) Appl. No.: 11/020,230

(22) Filed: Dec. 27, 2004

(65) Prior Publication Data

US 2005/0140121 A1 Jun. 30, 2005

(30) Foreign Application Priority Data

Dec. 24, 2003 (JP) .............................. 2003-427240
Nov. 8, 2004 (JP) .............................. 2004-323882

(51) Int. Cl.
*B60R 21/215* (2006.01)
(52) U.S. Cl. ..................................... 280/732
(58) Field of Classification Search ............ 280/728.3, 280/732, 743.1
See application file for complete search history.

(56) References Cited

U.S. PATENT DOCUMENTS

| 5,031,930 | A | | 7/1991 | Sato | |
|---|---|---|---|---|---|
| 6,010,146 | A | * | 1/2000 | Otsuka et al. ........... | 280/728.2 |
| 6,152,480 | A | * | 11/2000 | Iwanaga ................... | 280/728.3 |
| 6,601,870 | B2 | * | 8/2003 | Suzuki et al. ............ | 280/728.3 |
| 7,052,036 | B2 | * | 5/2006 | Lee et al. ................. | 280/728.3 |
| 2001/0040365 | A1 | * | 11/2001 | Kitagawa .................. | 280/730.2 |
| 2001/0040367 | A1 | * | 11/2001 | Nakashima et al. ..... | 280/743.1 |
| 2003/0184063 | A1 | * | 10/2003 | Yasuda et al. ............. | 280/732 |
| 2006/0103117 | A1 | * | 5/2006 | Hayashi .................... | 280/728.3 |
| 2006/0202447 | A1 | * | 9/2006 | Sawada .................... | 280/728.3 |
| 2006/0202448 | A1 | * | 9/2006 | Sawada et al. ........... | 280/728.3 |

FOREIGN PATENT DOCUMENTS

| JP | 2002012116 | 1/2002 |
|---|---|---|
| JP | 2003-137054 | 5/2003 |
| JP | 2003137054 | 5/2003 |

* cited by examiner

*Primary Examiner*—Paul N. Dickson
*Assistant Examiner*—Leonard McCreary, Jr.
(74) *Attorney, Agent, or Firm*—Manabu Kanesaka

(57) ABSTRACT

An airbag device includes an interior panel as a part of an inner surface of a vehicle cabin; a door portion formed in the interior panel and opening toward an inner side of the vehicle cabin; a retainer disposed behind a backside of the interior panel; an airbag accommodated in the retainer in a folded state; an inflator for inflating the airbag; and a door frame arranged between the retainer and the interior panel. The door frame includes a door frame movable member having a backing plate and a leg portion projecting from the backing plate; and a door frame fixed member having a flange portion and a leg portion projecting from the flange portion. The leg portion of the door frame fixed member has a height smaller than that of the leg portion of the door frame movable member.

6 Claims, 9 Drawing Sheets

AIRBAG DEVICE

BACKGROUND OF THE INVENTION AND RELATED ART STATEMENT

The present invention relates to an airbag device for a front passenger seat installed in an automobile. More particularly, the present invention relates to an airbag device in which a door of the airbag device lifts and opens toward a vehicle cabin when an airbag is deployed.

An airbag device for a front passenger seat installed in an automobile comprises an airbag in a folded state, a retainer for retaining the airbag, an inflator (gas generator) for inflating the airbag, and a lid or a door portion of an instrument panel disposed in front of the retainer. When the inflator generates gas, the airbag starts to be inflated and the lid or the door portion of the instrument panel is torn along a tear line and pressed to open by the airbag. Accordingly, the airbag is deployed into a vehicle cabin to protect an occupant.

Japanese Patent Publication (Kokai) No. 2003-137054 has disclosed an airbag device in which a door portion of an instrument panel is structured to lift and open toward an inside of a vehicle cabin when the airbag is inflated, so that the door portion of the instrument panel opens smoothly.

FIG. 4 is a sectional view of the airbag device disclosed in Japanese Patent Publication (Kokai) No. 2003-137054. FIG. 5 is a sectional view thereof in use, and FIG. 6 is a perspective view of a door frame. As shown in FIG. 4, an airbag 52 (FIG. 5) is folded and accommodated in a retainer 50 having a container-like shape with an open top. The airbag 52 is inflatable by an inflator 54. An upper side of the retainer 50 is covered with an instrument panel 60. The instrument panel 60 is provided with tear lines 62a and 62b formed of grooves. The tear line 62b extends along an upper periphery of the retainer 50. A portion surrounded by the tear line 62b becomes a door portion 64. The tear line 62a extends laterally at the middle of the door portion 64.

A door frame 70 is disposed on a backside of the instrument panel 60, and comprises a door frame movable member 72 and a door frame fixed member 74. The door frame fixed member 74 is formed of a rectangular frame, and the door frame movable member 72 is slidably fitted into the door frame fixed member 74. The door frame movable member 72 has a backing plate 72a attached to the door portion 64 of the instrument panel 60 and leg plates 72b as leg portions extending downwardly from both sides of the backing plate 72a. Hook holes 72c are formed in the leg plates 72b. The backing plate 72a is provided with a tear line 72d at a position aligning with the tear line 62a. Hinge chamfers 72e formed of grooves extend along corners between the backing plate 72a and the leg plates 72b, respectively. The backing plate 72a is bonded to a backside of the door portion 64 of the instrument panel 60 with vibration welding.

The door frame fixed member 74 comprises a leg frame 74a as a rectangular frame-like leg portion extending around an outer periphery of the retainer 50 and a flange portion 74b projecting outwardly from an upper edge of the leg frame 74a. The flange portion 74b is bonded to a peripheral portion of the door portion 64 of the instrument panel 60 with vibration welding. Hook holes 74c are formed in the leg frame 74a. Hooks 78 with a J shape are fixed to the retainer 50 and inserted into the hook holes 72c and 74c.

When the inflator 54 starts to eject gas, the airbag 52 is inflated and pushes the door frame movable member 72 to move upwardly (lift), as shown in FIG. 5. The instrument panel 60 is torn along the tear line 62b, so that the door portion 64 is separated from the instrument panel 60 around the door portion 64. The door portion 64 further moves upwardly together with the door frame movable member 72, and is further pressed by the airbag 52, so that the backing plate 72a and the door portion 64 are torn along the tear line 72d and the tear line 62a, respectively. As a result, the door portion 64 is divided into two pieces in the rightward and leftward directions so as to open like a door as shown in FIG. 5, thereby deploying the airbag 52 into the vehicle cabin.

The door portion 64 lifts and is separated from the instrument panel 60 around the door portion 64, so that the door portion 64 smoothly opens without receiving a reaction force from the instrument panel 60 around the door portion 64.

In the airbag device disclosed in Japanese Patent Publication (Kokai) No. 2003-137054, as shown in FIGS. 4 to 6, the leg frame 74a of the door frame fixed member 74 has a large height, thereby increasing a weight of the door frame fixed member 74 and material cost for production.

In view of the problem described above, an object of the present invention is to provide an airbag device having a door frame formed of a door frame fixing member and a door frame movable member, in which the door portion is opened when the door frame movable member lifts. In the airbag device of the present invention, it is possible to reduce a weight and cost of the door frame.

Further objects and advantages of the invention will be apparent from the following description of the invention.

SUMMARY OF THE INVENTION

In order to attain the objects described above, according to a first aspect of the present invention, an airbag device comprises an interior panel as a part of an inner surface of a vehicle cabin; a door portion formed in the interior panel and capable of opening like a door toward an inner side of the vehicle cabin; a retainer disposed behind a backside of the interior panel; an airbag accommodated in the retainer in a folded state; an inflator for inflating the airbag; and a door frame connecting the retainer and the interior panel. The door frame comprises a door frame movable member having a backing plate bonded to a backside of the door portion and a leg portion projecting from a side edge of the backing plate; and a door frame fixed member having a flange portion bonded to a peripheral portion of the interior panel around the door portion and a leg portion projecting from the flange portion. The leg portion of the door frame fixed member has a height smaller than that of the leg portion of the door frame movable member.

According to a second aspect of the present invention, in the airbag device of the first aspect, the leg portion of the door frame movable member is provided with a hook hole, and the retainer is provided with a hook for engaging the hook hole. Further, the leg portion of the door frame fixed member does not reach the hook hole.

According to a third aspect of the present invention, in the airbag device of the first or second aspect, the interior panel is formed of an instrument panel.

According to a fourth aspect of the present invention, in the airbag device of the first or second aspect, the interior panel is formed of a lid of the airbag device. The door frame fixed member is provided with a connector for connecting the door frame fixed member to an instrument panel around the lid. The connector restrains the door frame fixed member from moving toward the inner side of the vehicle cabin.

In the airbag device of the present invention, the leg portion of the door frame fixed member has a height smaller than that of the leg portion of the door frame movable member. Accordingly, it is possible to reduce a weight and cost of the door frame fixed member. When the inflator starts spouting gas to inflate the airbag, the airbag pushes the door frame movable member to move upwardly (lift), so that the door portion is separated from the interior panel around the door portion. The door portion further moves upwardly together with the door frame movable member and opens just like a door. Accordingly, the airbag is inflated into the vehicle cabin. The door portion lifts and is separated from the interior panel around the door portion, so that the door portion smoothly open without receiving a reaction force due to deformation of the interior panel around the door portion.

In the present invention, the leg portion of the door frame movable member is provided with the hook hole, and the retainer is provided with the hook for engaging the hook hole. The leg portion of the door frame fixed member does not reach the hook hole. Accordingly, it is possible to mold the door frame movable member and the door frame fixed member simultaneously with a single mold.

In the present invention, a vehicle cabin side of the retainer may be covered with the instrument panel. In this case, the door portion is formed in the instrument panel. The vehicle cabin side of the retainer may be covered with the lid. In this case, the door portion is formed in the lid. When the retainer is covered with the lid, it is preferable that the door frame fixed member is provided with the connector for connecting the door frame fixed member to the instrument panel around the lid, so that the connector restrains the door frame fixed member from moving toward the inner side of the vehicle cabin. Accordingly, it is possible to prevent the lid from lifting relative to the instrument panel even when the door portion is pressed upwardly by the door frame movable member when the airbag is inflated. As a result, the door frame movable member pushes mainly the door portion, thereby smoothly separating the door portion from the peripheral portion of the lid.

DETAILED DESCRIPTION OF PREFERRED EMBODIMENTS

Figure 1:
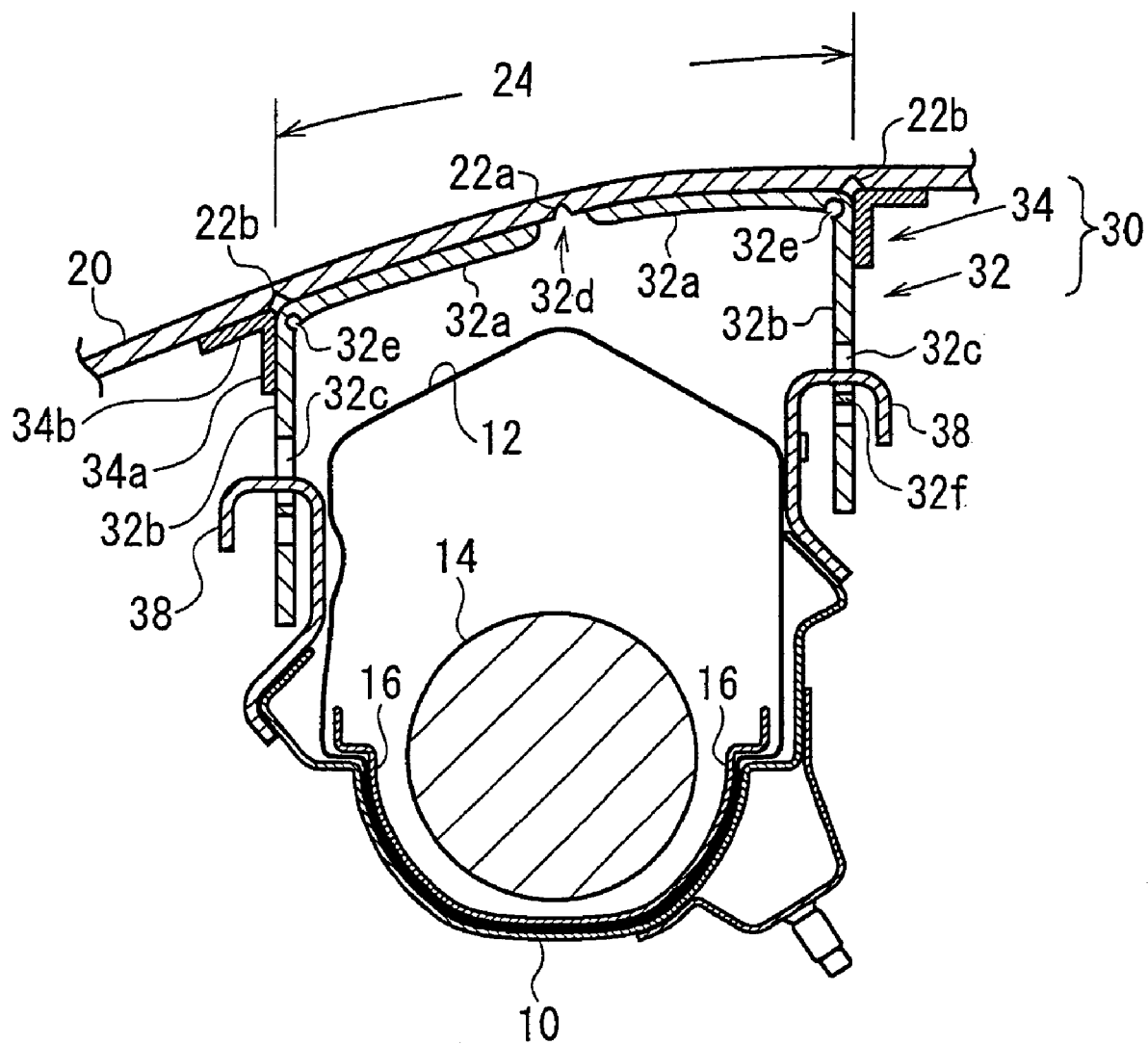
FIG. 1 is a sectional view of an airbag device according to an embodiment of the present invention.
Figure 2:
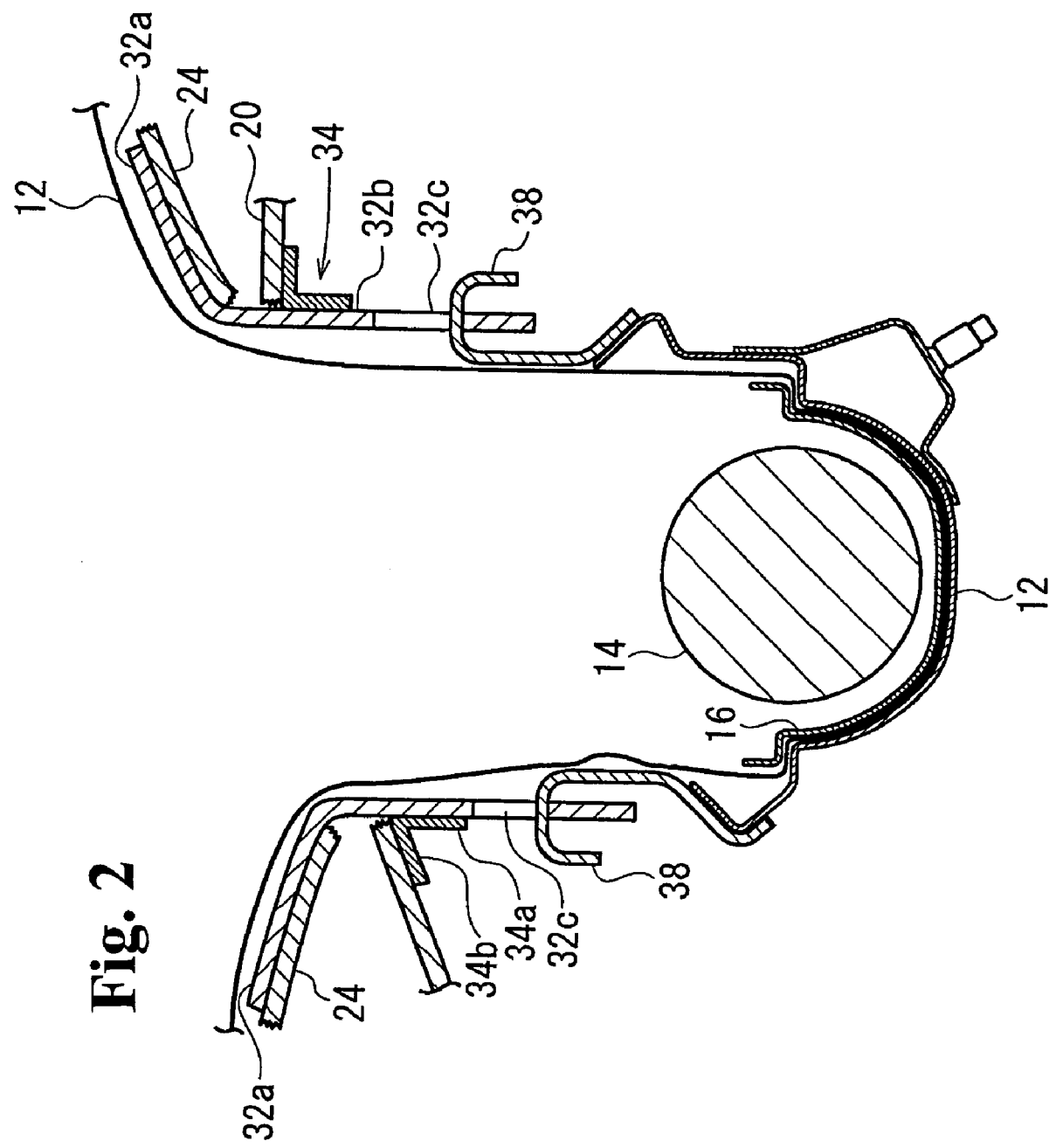
FIG. 2 is a sectional view of the airbag device shown in FIG. 1 in operation.
Figure 3:
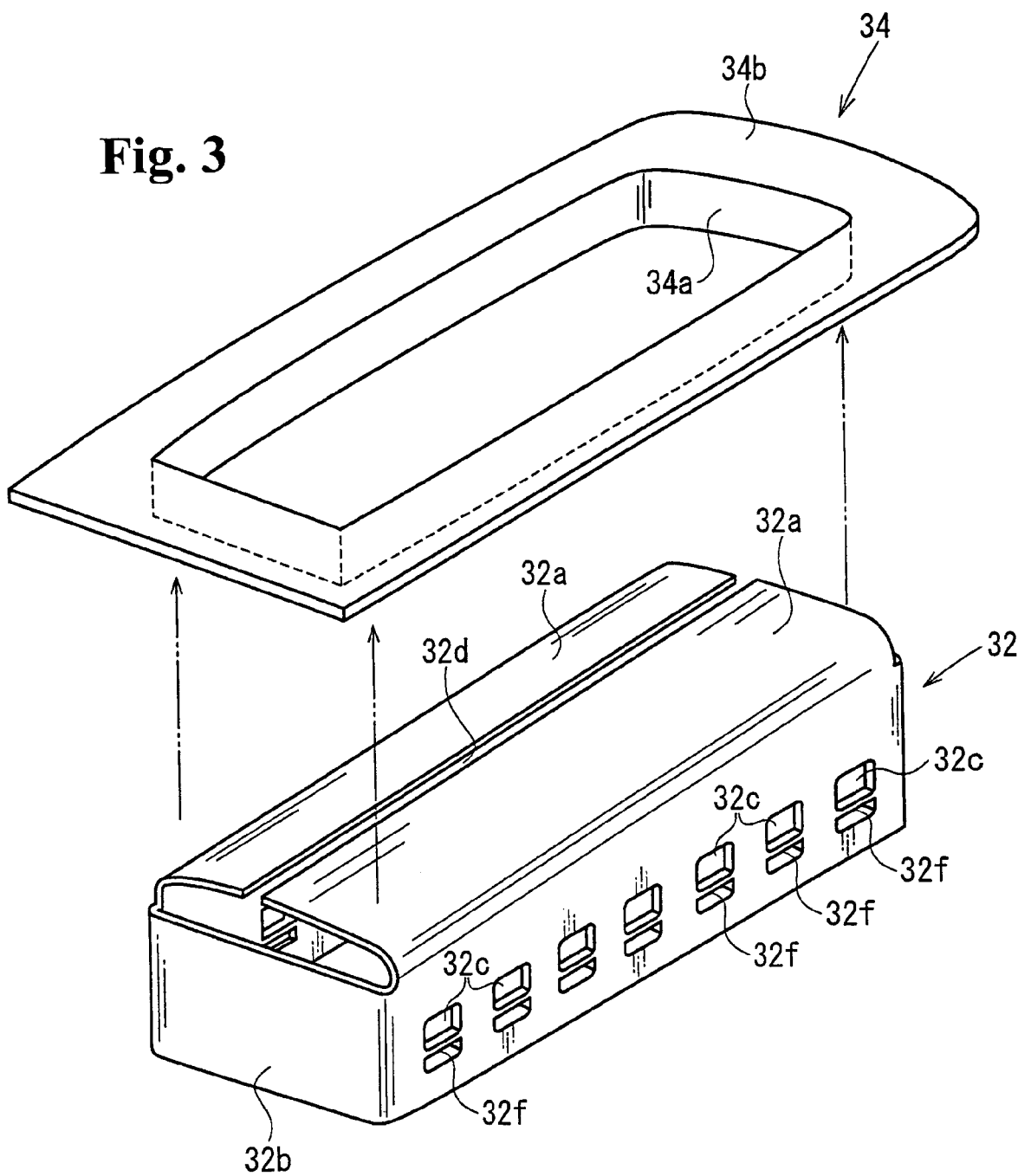
FIG. 3 is an exploded perspective view of a door frame of the airbag device shown in FIG. 1.

Hereinafter, embodiments of the present invention will be described with reference to the accompanying drawings. FIG. 1 is a vertical sectional view of an airbag device according to an embodiment. FIG. 2 is a sectional view of the airbag device shown in FIG. 1 in operation. FIG. 3 is an exploded perspective view of a door frame.

The airbag device is installed in an instrument panel for protecting a passenger in a front seat. A retainer 10 has a container-like shape with an open top, and an airbag 12 is accommodated in the retainer 10 in a folded state. An inflator 14 is provided for inflating the airbag 12. The airbag 12 is mounted to the retainer 10 with a mounting plate 16.

An upper side of the retainer 10 is covered with an instrument panel 20. The instrument panel 20 is provided with tear lines 22a and 22b formed of grooves. The tear line 22b extends along an upper periphery of the retainer 10. A portion surrounded by the round teat line 22b becomes a door portion 24. The tear line 22a extends laterally at the middle of the door portion 24.

A door frame 30 is disposed on a backside of the instrument panel 20, and comprises a door frame movable member 32 and a door frame fixed member 34. The door frame fixed member 34 is formed of a rectangular frame. The door frame movable member 32 is slidably fitted into the door frame fixed member 34.

The door frame movable member 32 has a leg frame 32b as a rectangular frame-like leg portion and tongue-like backing plates 32a extending from longitudinal sides of the leg frame 32b in directions approaching each other. Edges (ends in the projecting direction) of the backing plates 32a face each other with a small space (slit 32d) therebetween. The backing plates 32a are bonded to a backside of the door portion 24 of the instrument panel 20 with vibration welding. A slit 32d is aligned with the tear line 22a.

The leg frame 32b is provided with hook holes 32c. Each of the hook holes 32c has a shape elongated in a direction that the door frame movable member 32 moves (perpendicular to a backside of the instrument panel 20). In this embodiment, each of the hook holes 32c is provided with a partition bar 32f extending in a direction perpendicular to a direction that the door frame movable member 32 moves. Hinge chamfers 32e formed of grooves are formed along corners between the backing plates 32a and the leg frame 32b, respectively.

The door frame fixed member 34 comprises a leg frame 34a as a rectangular frame-like portion extending around an outer periphery of the retainer 10 and a flange portion 34b projecting outwardly from an upper edge of the leg frame 34a. The flange portion 34b is bonded to a peripheral portion of the instrument panel 20 around the door portion 24 with vibration welding. The leg frame 34a has a height smaller than that of the leg frame 32b of the door frame movable member 32, so that a lower end of the leg frame 34a does not reach the hook holes 32c. Hooks 38 having a J shape are fixed to the retainer 10 and inserted into the hook holes 32c.

When the inflator 14 starts spouting gas, the airbag 12 is inflated and pushes the door frame movable member 32 to move upwardly (lift), as shown in FIG. 2. When the door frame movable member 32 moves upwardly, the hooks 38 move downwardly within the hook holes 32c relative to the door frame movable member 32, thereby deforming or breaking the partition bars 32f. The instrument panel 20 is torn along the tear line 22b, so that the door portion 24 is separated from the instrument panel 20 around the door portion 24. The door portion 24 further moves upwardly together with the door frame movable member 32 and is further pressed by the airbag 12, whereby the door portion 24 is torn along the tear line 22a. Accordingly, as shown in FIG. 2, the door portion 24 and the backing plates 32a are divided into two pieces in the rightward and leftward directions so as to open like a door, and the airbag 12 is inflated into the vehicle cabin.

The door portion 24 is separated from the instrument panel 20 around the door portion 24 upon lifting, so that the door portion 24 opens smoothly without receiving a reaction force due to deformation of the instrument panel 20 around the door portion 24.

Figure 4:
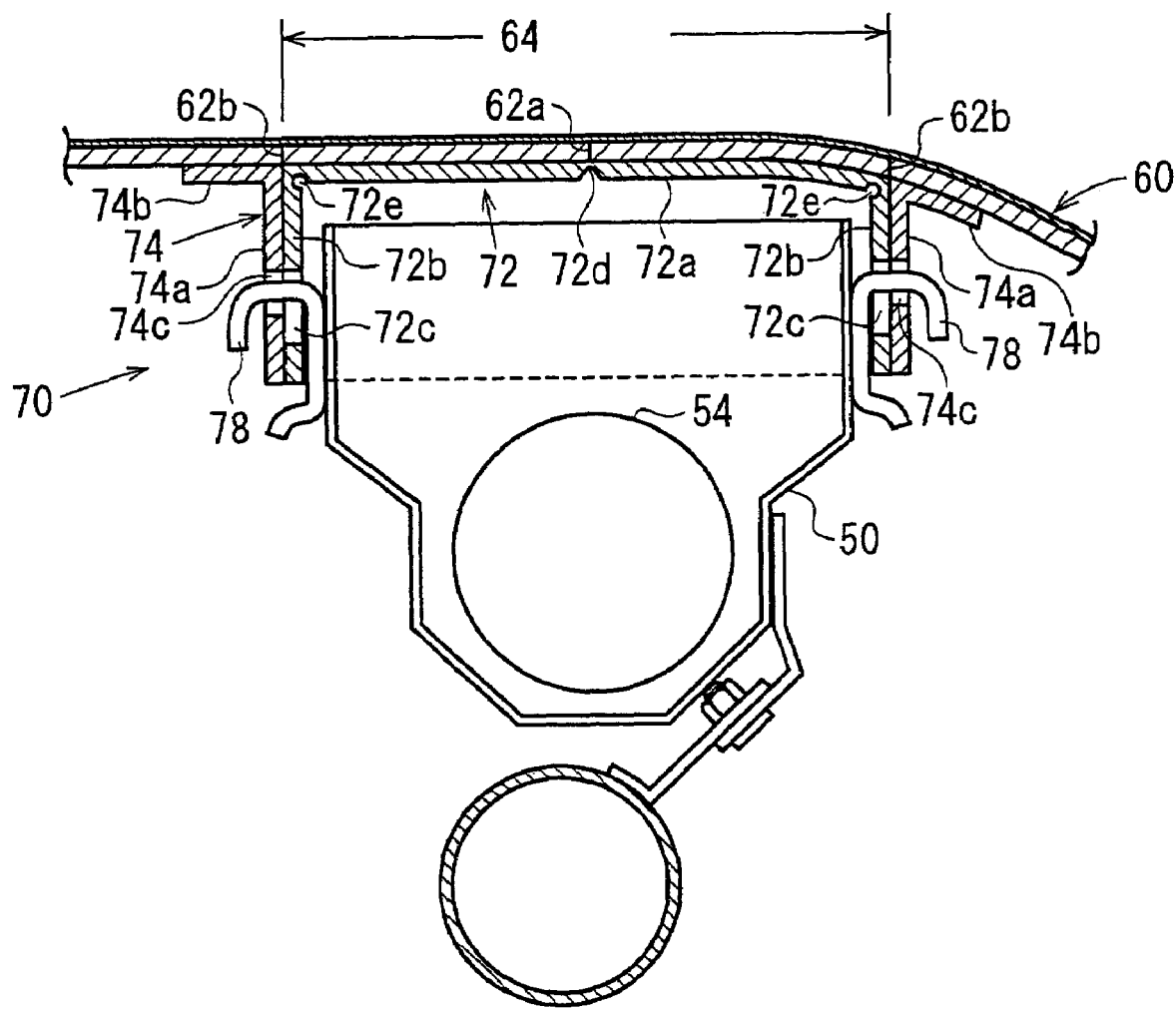
FIG. 4 is a sectional view of a conventional airbag device.
Figure 5:
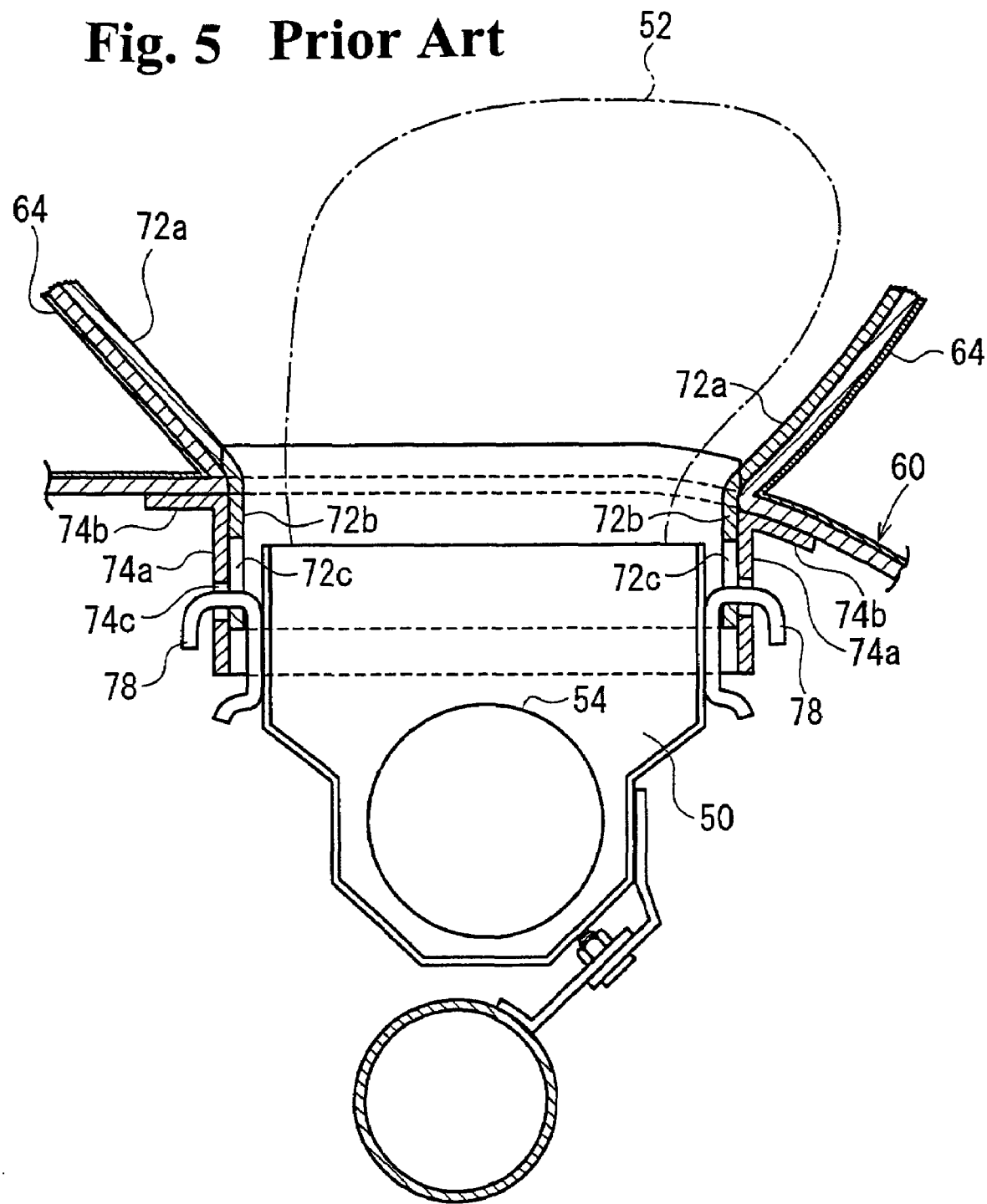
FIG. 5 is a sectional view of the airbag device shown in FIG. 4 in operation.
Figure 6:
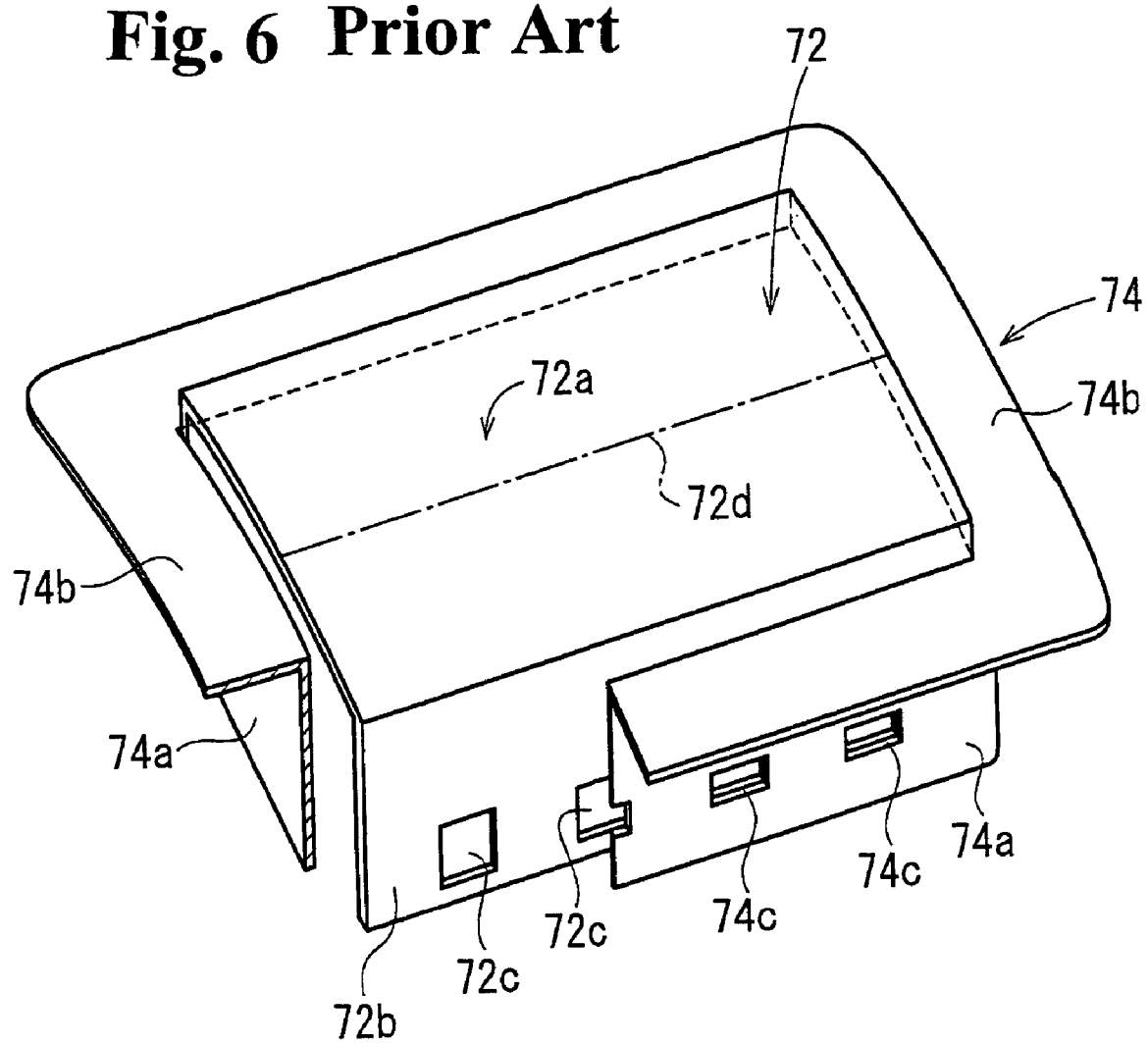
FIG. 6 is a perspective view showing a door frame of the airbag device shown in FIG. 4.

In the airbag device, the leg frame 34a, i.e., the leg portion of the door frame fixed member 34, has a height smaller than that of a conventional device shown in FIGS. 4 to 6. Accordingly, the door frame fixed member 34 has a weight smaller than that of the conventional device and can be produced with lower cost. In the embodiment, the leg frame 34a of the door frame fixed member 34 does not reach the hook holes 32c. Accordingly, it is possible to mold the door frame movable member 32 and the door frame fixed member 34 simultaneously with a single mold.

Figure 7:
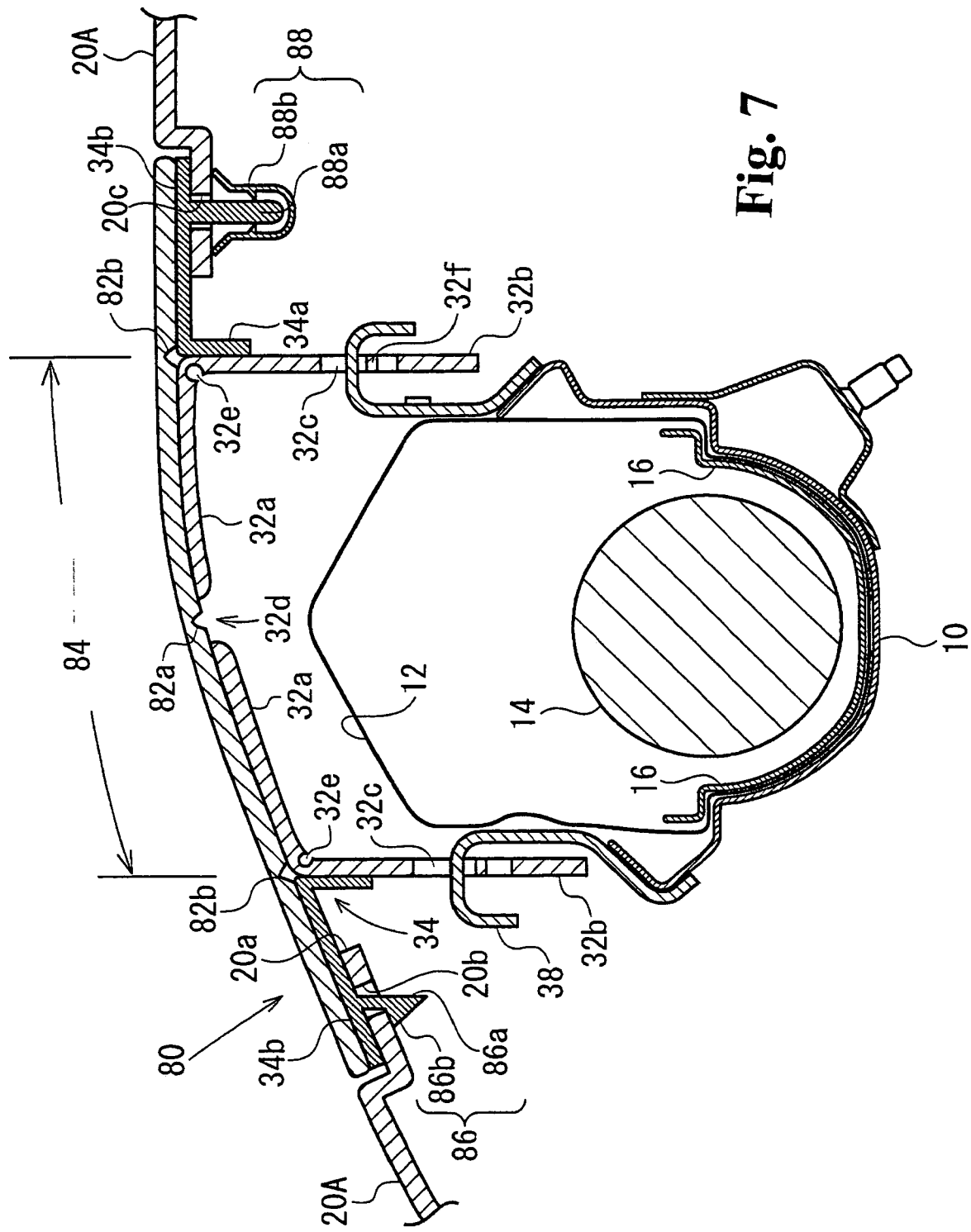
FIG. 7 is a sectional view of an airbag device according to another embodiment of the present invention.
Figure 8:
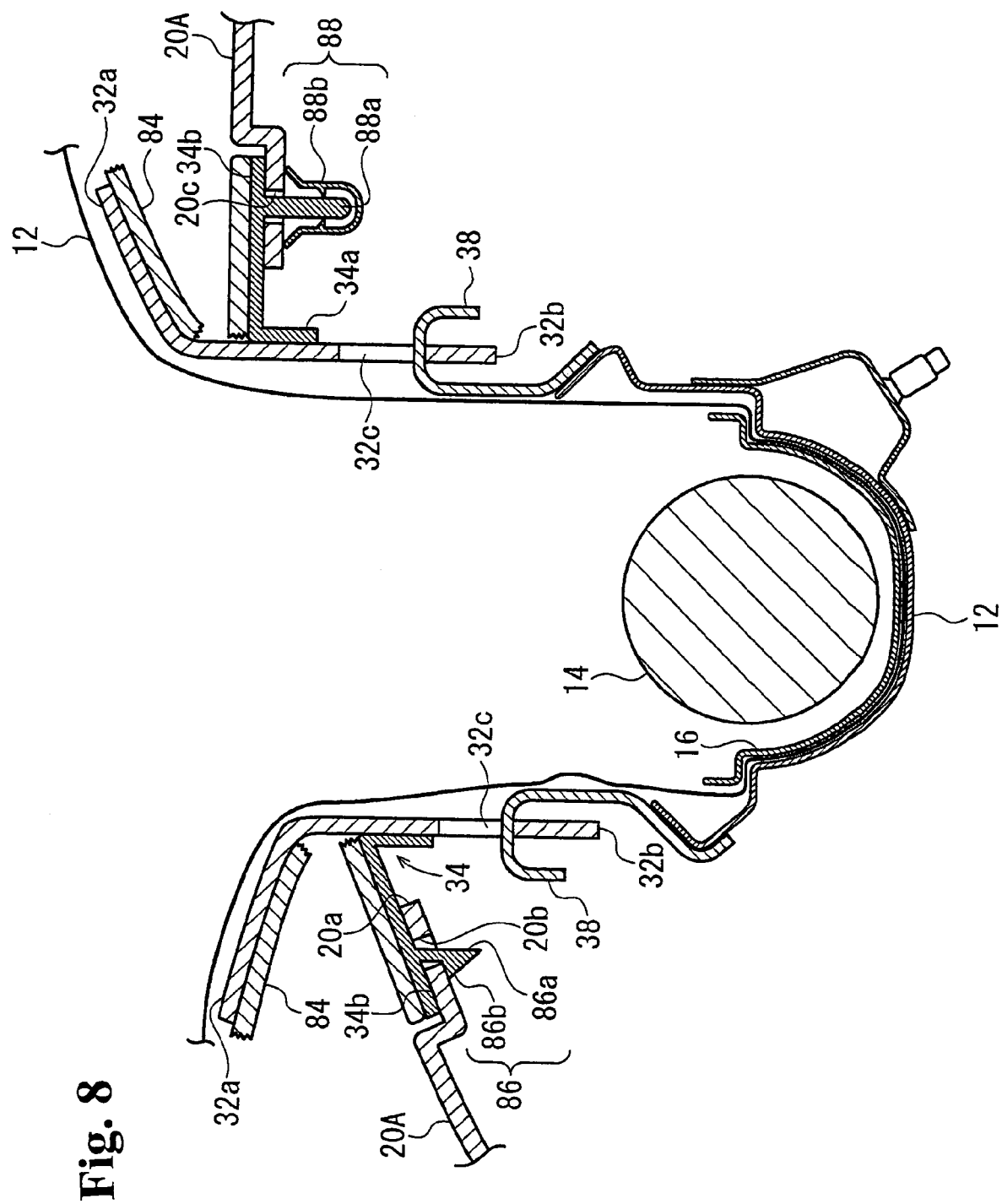
FIG. 8 is a sectional view of the airbag device shown in FIG. 7 in operation.
Figure 9:
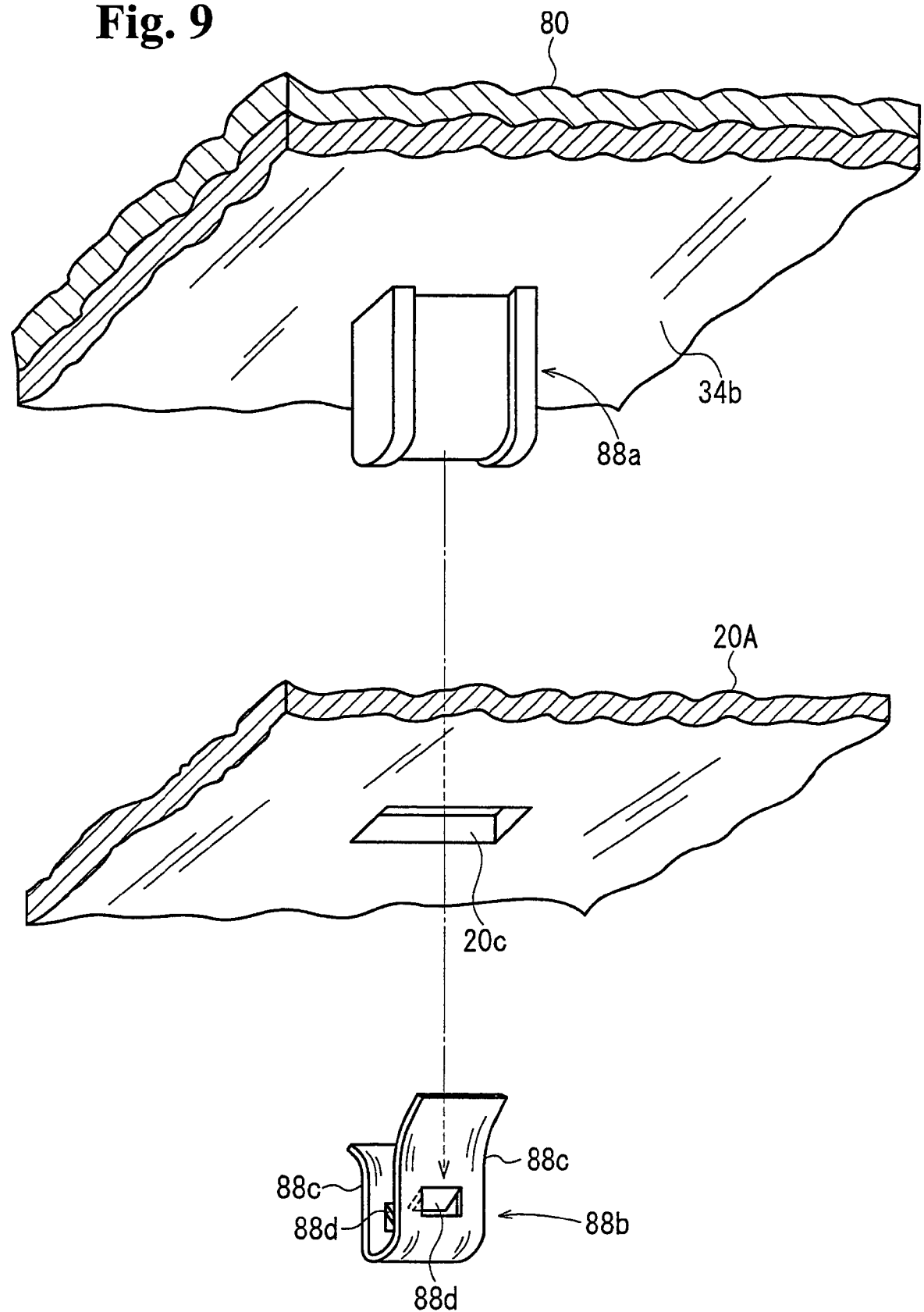
FIG. 9 is an exploded perspective view of a lid connector of the airbag device shown in FIG. 7.

FIG. 7 is a sectional view of an airbag device according to another embodiment of the present invention. FIG. 8 is a sectional view of the airbag device in operation, and FIG. 9 is an exploded perspective view of a connecting portion between a lid of the airbag device and an instrument panel.

In this embodiment, an upper side of the retainer 10 is covered with a lid 80. The lid 80 is provided with tear lines 82a and 82b formed of grooves. The tear line 82b extends along an upper periphery of the retainer 10. A portion surrounded by the round tear line 82b becomes a door portion 84. The tear line 82a extends laterally at the middle of the door portion 84. An outside portion of the door portion 84 (hereinafter, referred to as a peripheral portion) of the lid 80 overhangs outwardly from an upper peripheral edge of the retainer 10.

The door frame fixed member 34 is disposed on a backside of the lid 80 around the door portion 84, and the door frame movable member 32 is slidably fitted into the door frame fixed member 34. The door frame fixed member 34 has the flange portion 34b bonded to a peripheral portion of the lid 80 with vibration welding (hereinafter, the peripheral portion of the lid 80 and the flange portion 34b are referred to as the peripheral portion of the lid 80). The door frame movable member 32 has the backing plates 32a bonded to the backside of the door portion 84 with vibration welding.

In this embodiment, the flange portion 34b is provided with connecters 86 and 88 for connecting the door frame fixed member 34 to an instrument panel 20A. The connecter 86 is formed in a hook-like shape, and comprises a leg 86a extending downwardly from a backside of the flange portion 34b and a projection 86b projecting outwardly from an end portion of the leg 86a (in a direction opposite to a direction toward the center of the lid 80). The connecter 88 comprises a leg 88a extending downwardly from the backside of the flange portion 34b and a clip 88b attached to a lower portion of the leg 88a.

As shown in FIG. 9, the leg 88a is formed of a flat plate, and the clip 88b is formed in a substantially U-like shape for holding the leg 88a from beneath. As shown in FIG. 9, the clip 88b is provided with claws 88d projecting from inner surfaces of opposite sides 88c facing side surfaces of the leg 88a. The claws 88d bite into the side surfaces to prevent the clip 88b from coming off. Upper end portions of the opposite sides 88c are curved to expand in a direction apart from each other, so that a distance between the upper ends is larger than a width of a slot 20c (described later).

In this embodiment, the flange portion 34b is provided with the connecters 86 along a front-side edge of the lid 80 (a left-side edge in FIGS. 7 and 8, or a passenger side edge) and the connecters 88 along a rear-side edge (a right-side edge in FIGS. 7 and 8). The instrument panel 20A is provided with an opening 20a for mounting the airbag device. The instrument panel 20A is also provided with slots 20b and 20c for inserting the connectors 86 and 88 along a front-side edge and a rear-side edge of the opening 20a, respectively. The retainer 10 is arranged in the opening 20a, and the lid 80 covers the opening 20a. A peripheral portion of the lid 80 is superposed on a peripheral portion of the opening 20a. The connectors 86 and 88 engage the slots 20b and 20c, respectively.

A lower step portion (reference numeral omitted) is formed around the peripheral portion of the opening 20a, and becomes lower than a surrounding portion. The peripheral portion of the lid 80 (and the flange portion 34b) is superposed on the lower step portion, so that the upper surface of the lid 80 is flush with an upper surface of the instrument panel 20A around the lower step portion.

When the lid 80 is mounted to the opening 20a, first, the connectors 86 at the front side of the lid 80 are inserted into the slots 20b, and the projections 86b are hooked on lower sides of the slots 20b. Then, a rear side portion of the lid 80 is swung downwardly about an engaging portion between the connectors 86 and the slots 20b, so that the legs 88a of the connectors 88 are inserted into the slots 20c. At this time, the peripheral portion of the lid 80 is fitted into the lower step portion around the opening 20a. After that, the clips 88b are pressed to cover the legs 88a from behind the instrument panel 20A, so that upper portions of the opposite sides 88c of each clip 88b abut against lower portions of the slots 20c. Accordingly, the legs 88a do not come off the slots 20c, and the peripheral portion of the lid 80 is connected to the peripheral portion of the opening 20a.

The other features of the airbag device are the same as those of the airbag device shown in FIGS. 1 to 3. The same reference numerals used in the previous embodiment designate the same components.

In the airbag device having the structure described above, when the inflator 14 starts spouting gas, the airbag 12 is inflated and pushes the door frame movable member 32 to move upwardly, so that the door portion 84 is pressed upwardly as shown in FIG. 8. Accordingly, the lid 80 is torn along the tear line 82b, so that the door portion 84 is separated from the lid 80 around the door portion 84 and moves upwardly together with the door frame movable member 32. The door portion 84 is further pressed by the airbag 12, whereby the door portion 84 is torn along the tear line 82a. As a result, the door portion 84 and the backing plates 32a are divided into two pieces in the rightward and leftward directions, as is seen in FIG. 8. The door portion 84 opens like a door, and the airbag 12 is inflated into the vehicle cabin.

In the airbag device, the door portion 84 is separated from the lid 80 around the door portion 84 upon lifting. Accordingly, the door portion 84 opens smoothly without receiving a reaction force due to deformation of the lid 80 around the door portion 84. The flange portion 34b of the door frame fixed member 34 is bonded to the peripheral portion of the lid 80, and is connected to the instrument panel 20A with the connectors 86 and 88. Accordingly, the flange portion 34b of the door frame fixed member 34 is restrained from moving toward the inside of the vehicle cabin. Therefore, even when the door portion 84 is pressed upwardly by the door frame movable member 32, the lid 80 does not lift from the instrument panel 20A. Thus, the door frame movable member 32 pushes mainly the door portion 84, whereby the door portion 84 is smoothly separated from the peripheral portion of the lid 80.

The disclosures of Japanese Patent Applications No. 2003-427240, filed on Dec. 24, 2003, and No. 2004-323882, filed on Nov. 8, 2004, are incorporated in the application.

While the invention has been explained with reference to the specific embodiments of the invention, the explanation is illustrative and the invention is limited only by the appended claims.

What is claimed is:

1. An airbag device comprising:
   an interior panel,
   a door portion formed in the interior panel to open toward an inner side of a vehicle cabin,
   a retainer disposed behind the interior panel and having a hook,
   an airbag disposed in the retainer in a folded state,
   an inflator disposed in the retainer for inflating the airbag, and
   a door frame arranged between the retainer and the interior panel and including a door frame movable member having a backing plate attached to a backside of the door portion and a first leg portion projecting rearwardly from the backing plate, and a door frame fixed member having a flange portion attached to the interior panel around the door portion and a second leg portion projecting from the flange portion, said second leg portion having a length smaller than that of the first leg portion,
   wherein said first leg portion includes a hook hole, and a partition bar disposed in the hook hole to extend horizontally therein, said hook being located in the hook hole above the partition bar so that the partition bar is deformed or broken by the hook when the door frame movable member is moved upwardly upon actuation of the inflator.

2. An airbag device according to claim 1, wherein said second leg portion is located above the hook hole.

3. An airbag device according to claim 1, wherein said interior panel is formed of an instrument panel.

4. An airbag device according to claim 1, wherein said interior panel is formed of a lid, said door frame fixed member having a connector for connecting the door frame fixed member to an instrument panel around the lid, said connector restraining the door frame fixed member from moving toward the inner side of the vehicle cabin.

5. An airbag device according to claim 1, wherein said interior panel includes a tear line formed at an inner side thereof, said tear line comprising a groove extending along an inner periphery side of the door frame fixed member so that the door portion is torn along the groove.

6. An airbag device according to claim 5, wherein said interior panel further includes another tear line formed at an inner side thereof, said another tear line comprising a groove extending in a longitudinal direction in a center of the door portion, said back plate being spaced at the another tear line.

* * * * *